(12) United States Patent
Brown et al.

(10) Patent No.: US 9,706,441 B2
(45) Date of Patent: Jul. 11, 2017

(54) METHOD AND A DEVICE FOR REGULATING TRANSMISSIONS IN A TELECOMMUNICATIONS NETWORK

(75) Inventors: Patrick Brown, Cagnes sur Mer (FR); Jérôme Galtier, Nice (FR)

(73) Assignee: ORANGE, Paris (FR)

( * ) Notice: Subject to any disclaimer, the term of this patent is extended or adjusted under 35 U.S.C. 154(b) by 245 days.

(21) Appl. No.: 13/883,557

(22) PCT Filed: Oct. 28, 2011

(86) PCT No.: PCT/FR2011/052536
§ 371 (c)(1),
(2), (4) Date: May 3, 2013

(87) PCT Pub. No.: WO2012/059674
PCT Pub. Date: May 10, 2012

(65) Prior Publication Data
US 2013/0223215 A1  Aug. 29, 2013

(30) Foreign Application Priority Data
Nov. 4, 2010  (FR) .................................... 10 59096

(51) Int. Cl.
*H04J 1/16* (2006.01)
*H04W 28/12* (2009.01)
(Continued)

(52) U.S. Cl.
CPC ......... *H04W 28/12* (2013.01); *H04W 74/008* (2013.01); *H04W 48/08* (2013.01); *H04W 48/16* (2013.01); *H04W 74/085* (2013.01); *H04W 74/0833* (2013.01); *H04W 84/12* (2013.01)

(58) Field of Classification Search
CPC ... H04W 74/008; H04W 28/12; H04W 48/08; H04W 48/16; H04W 74/085; H04W 84/12; H04W 74/0833
See application file for complete search history.

(56) References Cited

U.S. PATENT DOCUMENTS

2005/0058151 A1\* 3/2005 Yeh ................................ 370/445
2007/0140115 A1\* 6/2007 Bienas et al. ................. 370/230
(Continued)

FOREIGN PATENT DOCUMENTS

FR         2 893 206 A1    5/2007
WO    WO 2007/051946 A1    5/2007
(Continued)

OTHER PUBLICATIONS

Abichar, et al. 2005. CONTI: Constant-Time Contention Resolution for WLAN Access. In R. Boutaba, Almeroth, K., Puigjaner, R., Shen, S., and Black, J. P. (Eds.), *Networking 2005: Networking Technologies, Services, and Protocols; Performance of Computer and Communication Networks; Mobile and Wirelsss Communication Systems, LNCS 3462* (pp. 358-369). Proceedings of the 4th International IFIP-TC6 Networking Conference, IFIP International Federation for Information Processing. Springer: Waterloo, Canada.
(Continued)

*Primary Examiner* — Ayaz Sheikh
*Assistant Examiner* — Hai-Chang Hsiung
(74) *Attorney, Agent, or Firm* — Knobbe, Martens, Olson & Bear, LLP (57) ABSTRACT

A transmission regulation method which may be performed by a station having at least one data frame for transmitting over a telecommunications network is disclosed. In one aspect, the method comprises, during at least one selection round from a set of selection rounds, obtaining a value representative either of an authorization to transmit or a prohibition to transmit the frame. Furthermore, when the value is representative of an authorization to transmit, transmitting an information signal over a first communications channel of the network, to inform the other stations that the station has obtained a value representative of an authorization to transmit; or when the value is representative of a (Continued)

prohibition to transmit, listening for an information signal, if any, transmitted over the first communications channel of the network. The method listens to or transmits over a second communications channel of the network that is different from the first communications channel.

14 Claims, 3 Drawing Sheets

(51) Int. Cl.
    *H04W 74/00*    (2009.01)
    *H04W 48/08*    (2009.01)
    *H04W 48/16*    (2009.01)
    *H04W 74/08*    (2009.01)
    *H04W 84/12*    (2009.01)

(56) References Cited

U.S. PATENT DOCUMENTS

2008/0279257 A1* 11/2008 Vujcic et al. .................. 375/132
2010/0322220 A1* 12/2010 Brown et al. .................. 370/338

FOREIGN PATENT DOCUMENTS

WO    WO 2009/095628 A1    8/2009
WO    WO 2012/022822    *    2/2012    ............ H04W 40/00

OTHER PUBLICATIONS

Galtier, J. 2007. Analysis and optimization of MAC with constant size congestion windows for WLAN. *Proceedings on the Third International Conference on Services and Networks Communications, INRIA*, Library of Congress No. 2007930108.

IEEE-SA Standards Board. ANSI/IEEE Std 802.11, 1999 Edition (R2003). IEEE 802.11 a-1999, IEEE 802.11 b-1999, IEEE 802.11 d-2001. Part 11: Wireless LAN medium access control (MAC) and physical layer (PHY) specifications.

Jacquet, et al. 1996. Priority and collision detection with active signaling—The channel access mechanism of HIPERLAN. *Wireless Personal Communications*, 4:11-26.

International Search Report mailed May 22, 2012 for PCT/FR2011/052536 filed Oct. 28, 2011.

* cited by examiner

METHOD AND A DEVICE FOR REGULATING TRANSMISSIONS IN A TELECOMMUNICATIONS NETWORK

RELATED APPLICATIONS

This application is the U.S. National Phase of Application No. PCT/FR2011/052536 entitled "METHOD AND DEVICE FOR CONTROLLING A BROADCAST IN A TELECOMMUNICATION NETWORK" filed Oct. 28, 2011, which designated the United States, and which claims the benefit of French Application No. 1059096 filed Nov. 4, 2010.

BACKGROUND OF THE INVENTION

The present invention relates to the field of wireless telecommunications networks, in particular wireless local access networks (WLANs) in compliance with the IEEE 802.11 family of standards.

Such networks are also known as WiFi networks. They are used in numerous applications for networking stations (e.g. computers, personal digital assistants, and peripherals).

In document "IEEE 802.11a-1999, IEEE 802.11b-1999, IEEE 802.11 d-2001, Part 11: wireless LAN medium access control (MAC) and physical layer (PHY) specifications" the 802.11 standard defines a method of regulating traffic in a wireless network. That method makes use of a congestion window (CW) system for regulating the traffic. According to that standard, in order to determine the instant at which a data frame is to be transmitted, a station draws a random number in the range 0 to CW-1, where the value CW is an integer lying in the range $CW_{min}$ to $CW_{max}$ as specified by the 802.11 standard.

The number that has been drawn is used for a countdown prior to transmitting the frame, the countdown being deferred if the station finds that some other station is transmitting. Unfortunately, that congestion window system leads to a large number of collisions in the wireless network, and from the point of view of the user that leads to a significant loss of bandwidth.

A mechanism known as the "tournament method" can be used by the various stations for regulating the transmission of frames and for limiting the collision rate. That tournament method is described in the document by Z. Abichar and M. Chang entitled "CONTI: constant time contention resolution for WLAN access", IFIP Networking 2005.

The tournament method consists in organizing a kind of tournament between stations having at least one frame to transmit. A tournament is made up of a certain number of selection rounds, each of which is executed during a time interval of predefined duration that enables each station to have the time to listen for transmission by any other station. This duration is typically equal to the duration of a "Slot-Time" that, according to the IEEE 802.11 standard, is defined as the elementary time interval in the procedure for resolving contention by the congestion window. At the beginning of the tournament, it can happen that all of the stations having a frame to transmit are authorized to transmit that frame. On each selection round, one or more stations can be eliminated from the list of stations that are authorized to transmit depending on whether during that selection round a station has had allocated thereto a transmission authorization or a transmission prohibition. At the end of the tournament, only those stations that have not been eliminated are authorized to transmit. If a plurality of stations are still in the running at the end of the tournament, then they transmit simultaneously, thereby giving rise to a collision and thus to disturbed reception, with it being impossible to receive the transmitted data frames correctly. Those stations must therefore participate in the following tournament in order to make another attempt at transmitting those frames.

The Hiperlan protocol is one of the first protocols to incarnate the tournament function.

For further information, the person skilled in the art may refer to the document by Philippe Jacquet, Pascale Minet, Paul Mühlethaler, and Nicolas Rivierre "Priority and collision detection with active signaling—the channel access mechanism of HIPERLAN", Wireless Personal Communications 4: 11-26, 1996.

Documents FR 2 893 206 and WO 2009/095628 explain respectively how to improve considerably the effectiveness of tournaments by making the probabilities of the draw depend on the history of the tournament, and how to guarantee bounded access times to stations in order to enable synchronous streams to be transmitted over wireless networks with good quality of service.

In prior art tournaments, the probability of a negative outcome, i.e. of transmission with collision when at least two stations consider that they have won the tournament, diminishes asymptotically with $\frac{1}{2}^{k_{max}}$, where $k_{max}$ is the number of selection rounds. In order to guarantee good performance, the number of rounds, and thus the duration of the tournament, must be greater than a certain threshold. Thus, the Applicant has found that networks implementing a tournament method can suffer from a poor utilization rate of their bandwidth since, in a six-round tournament by way of example, the length of time taken to execute the contention resolution protocol can represent about 25% of the time needed for transmitting a data frame over an IEEE 802.11n network.

In addition, in a network in which certain stations perform a tournament method, while other stations perform a congestion window procedure, of the kind mentioned above, then collisions can lead to a tournament failing.

OBJECT AND SUMMARY OF THE INVENTION

The present invention seeks to provide a transmission regulation method using a tournament method that does not present the drawbacks of methods known in the prior art.

More particularly, the invention relates to a transmission regulation method suitable for being performed by a station having at least one data frame for transmitting over a telecommunications network, the method comprising, during at least one selection round from a set of selection rounds:

an obtaining step of obtaining a value representative either of an authorization to transmit or else of a prohibition to transmit said frame;

when said value is representative of an authorization to transmit, a transmission step of transmitting an information signal over a first communications channel of said network, in order to inform the other stations that said station has obtained a value representative of an authorization to transmit; or when said value is representative of a prohibition to transmit, a listening step of listening for an information signal, if any, transmitted over the first communications channel of said network; and a listening or transmission step of listening to or transmitting over a second communications channel of said network that is different from the first communications channel.

In an advantageous implementation, the listening or transmission step of listening to or transmitting over the second communications channel is performed simultaneously with the step of transmitting over the first communications channel or the step of listening to the first communications channel.

In corresponding manner, the invention provides a transmission regulation device for a station having at least one data frame to be transmitted over a wireless telecommunications network, the device comprising:

obtaining means for acting during at least one selection round of a set of selection rounds, to obtain a value that is representative either of an authorization to transmit or else of a prohibition to transmit said frame;

signal transmission means for transmitting an information signal in a first communications channel of said network in order to inform the other stations that said station has obtained a value that is representative of an authorization to transmit, which means are activated when said value is representative of an authorization to transmit;

listener means for listening for any information signal transmitted over the first communications channel of said network, which means are activated when said value is representative of a prohibition to transmit; and listener or transmitter means for listening to or transmitting over a second communications channel of said network that is different from the first communications channel.

In an advantageous embodiment, the listener or transmitter means for listening to or transmitting over the second communications channel are activated simultaneously with the transmitter means for transmitting over the first communications channel or with the listener means for listening to the first communications channel.

Thus, while the tournament is taking place, a station can transmit a plurality of signals simultaneously, can receive a plurality of signals simultaneously, or can transmit one signal and receive another signal simultaneously, thereby enabling the efficiency of the tournament to be improved in various ways.

In the first implementation of the regulation method, the listening or transmission step of listening to or transmitting over the second communications channel comprises, simultaneously with transmitting or listening for the information signal in the first communications channel, transmitting a busy signal in the second channel.

Correspondingly, in the first embodiment of the regulation device, the listener or transmitter means for listening to or transmitting over the second communications channel are configured to transmit a busy signal over the second channel while simultaneously transmitting or listening for the information signal in the first communications channel.

The tournament performed enables a station authorized to transmit a data frame to be selected in effective manner. Furthermore, while the tournament is taking place, the busy signal serves to inform any stations that are not participating in the tournament that the tournament is taking place. Such stations may for example be stations using a congestion window access mechanism. Since those stations are informed that the tournament is taking place, they defer their countdowns and they do not transmit any frames while the tournament is taking place, thereby enabling collisions to be avoided. This serves to improve the effectiveness of the tournament and also facilitates coexistence between stations using a tournament mechanism and stations using some other mechanism.

The transmission of the busy signal in the second channel may be preceded by a test seeking to determine whether the station belongs to a subset of stations that are to transmit the busy signal.

This serves to avoid too great a number of stations transmitting the busy signal, which might for example lead to interference with other wireless communications.

In a second implementation of the regulation method, the listening or transmission step of listening to or transmitting over the second communications channel, comprises, simultaneously with transmitting or listening for the information signal in the first communications channel, listening to the second channel for any data frame transmitted by a station that is not participating in the tournament, and when a frame is detected in the second channel, a step of determining that the station that is participating in the tournament is not authorized to transmit a data frame.

Correspondingly, in a second embodiment of the regulation device, the listener or transmitter means for listening to or transmitting over the second communications channel are suitable for listening to the second channel for any data frame transmitted by a station that is not participating in the tournament, while simultaneously transmitting or listening to the information signal in the first communications channel, the regulation device including means for determining that the station that is participating in the tournament is not authorized to transmit a data frame, which means are activated when a frame is detected in the second channel.

The second implementation thus serves to use the first channel for performing the tournament while listening simultaneously to the second channel in which stations that are not participating in the tournament might transmit frames. If it is detected that a station that is not participating in the tournament is transmitting a frame, then the tournament is interrupted without any of the stations participating in the tournament transmitting a data frame. That serves to avoid blocking the second channel while the tournament is taking place, with other stations having the possibility of transmitting frames. Furthermore, collision is avoided between the frame transmitted by the station that is not participating in the tournament and the frame that would otherwise have been transmitted by the station winning the tournament.

Thus, in this implementation also, the effectiveness of the tournament is improved and coexistence is facilitated between stations using a tournament mechanism and stations using some other mechanism.

In a third implementation of the regulation method, a plurality of values are representative of an authorization to transmit, the first communications channel being selected from a set of communications channels as a function of the value that has been obtained that is representative of an authorization to transmit, the second communications channel being made up of at least one frequency that does not form part of the selected channel, and the listening or transmission step of listening to or transmitting over the second communications channel comprising, simultaneously with the transmission of the information signal over the first communications channel, listening for an information signal in at least the second communications channel.

Correspondingly, in a third embodiment of the regulation device, a plurality of values are representative of an authorization to transmit, the first communications channel being selected from a set of communications channels as a function of the value that has been obtained that is representative of an authorization to transmit, the second communications channel being made up of at least one frequency that does not form part of the selected channel, and the listener or transmitter means for listening to or transmitting over the second communications channel being suitable for listening for an information signal in at least the second communications channel while simultaneously transmitting the information signal in the first communications channel.

Under such circumstances, the tournament enables a station authorized to transmit a data frame to be selected effectively while using only a small number of rounds $k_{max}$. If m is the number of values representative of an authorization to transmit, then on each round it is possible to distinguish between m+1 classes of station instead of between only two as in prior art tournaments. The probability of a negative outcome to the tournament, i.e. of transmission with collision when at least two stations consider that they have won the tournament, decreases with $1/(m+1)^{k_{max}}$. The number of rounds $k_{max}$, and thus the duration of the tournament, can thus be reduced while still conserving a determined probability for a negative outcome.

In a variant of this third embodiment, a priority level is allocated to each of the channels of said set of channels and each of the values representative of an authorization to transmit is representative of a said priority level, the first communications channel being the channel having allocated thereto the priority level represented by the value that has been obtained, and the second communications channel being made up of at least one frequency forming part of a channel of said set having allocated thereto a priority level that is higher than the priority level represented by the value that has been obtained, but that does not form part of a channel of said set having allocated thereto a priority level that is less than or equal to the priority level represented by the value that has been obtained.

The first communications channel and the second communications channel may correspond to two different sets each of at least one frequency.

Under such circumstances, the invention is easy to implement in a WLAN type wireless network.

In an implementation, the various steps of the regulation method of the invention are determined by computer program instructions.

Consequently, the invention also provides a computer program on a data medium, the program being suitable for being implemented in a station or more generally in a computer, the program comprising instructions adapted to implementing steps of a regulation method as described above.

The method may use any programming language and it may be in the form of source code, object code, or code intermediate between source code and object code, such as a partially compiled form or in any other desirable form.

The invention also provides a computer readable data medium that includes instructions of a computer program as mentioned above.

The data medium may be any entity or device capable of storing the program.

For example, the data medium may comprise storage means such as a read only memory (ROM), e.g. a compact disk (CD) ROM, or a microelectronic circuit ROM, or indeed magnetic recording means, e.g. a floppy disk or a hard disk.

Furthermore, the information medium may be a transmissible medium such as an electrical or optical signal, suitable for being conveyed via an electrical or optical cable, by radio, or by other means.

The program of the invention may in particular be downloaded from an Internet type network.

Alternatively, the data medium may be an integrated circuit in which the program is incorporated, the circuit being adapted to be used in executing the method in question.

In another implementation, the invention uses software and/or hardware components. In this context, the term "module", may correspond in this document equally well to a software component and to a hardware component. A software component corresponds to one or more computer programs, one or more subprograms of a program, or more generally to any program element designed to implement a function or a set of functions. A hardware component comprises any element of a set of hardware designed to put forward a function or a set of functions.

BRIEF DESCRIPTION OF THE DRAWINGS

Other objects, characteristics, and advantages of the invention appear from the following description given purely by way of non-limiting example and made with reference to the accompanying drawings, in which.

DETAILED DESCRIPTION OF EMBODIMENTS OF THE INVENTION

Figure 1:
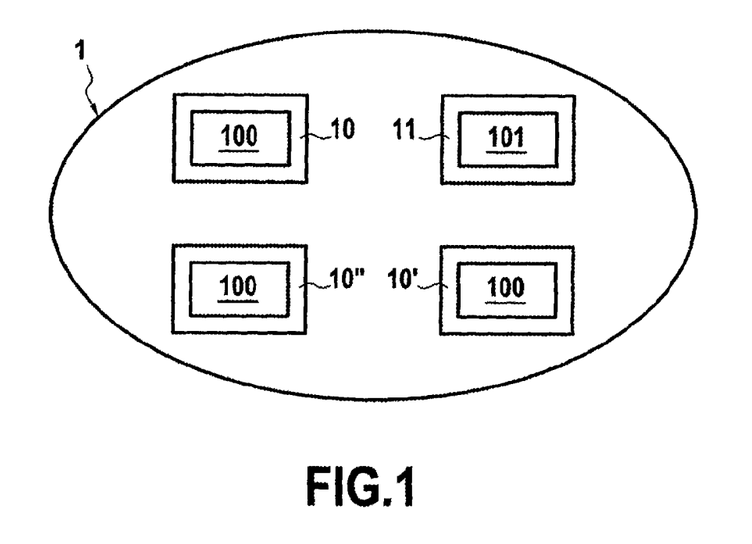
FIG. 1 shows a wireless telecommunications network with stations in accordance with the invention in a particular embodiment.

FIG. 1 shows a wireless telecommunications network 1 having stations 10, 10', 10" in accordance with the invention moving about therein. Stations 11 in accordance with a prior art embodiment may also move within the network 1, one such station being shown in FIG. 1.

Each of the stations 10 includes a transmission regulation device 100 in accordance with the invention. In the embodiment shown in FIG. 2, the regulation device 100 of the invention comprises a processor 110, a random access memory (RAM) 120, a ROM 130, and an access module 140 for giving access to the network 1. These various elements are connected together by a bus system (not referenced).

Figure 2:
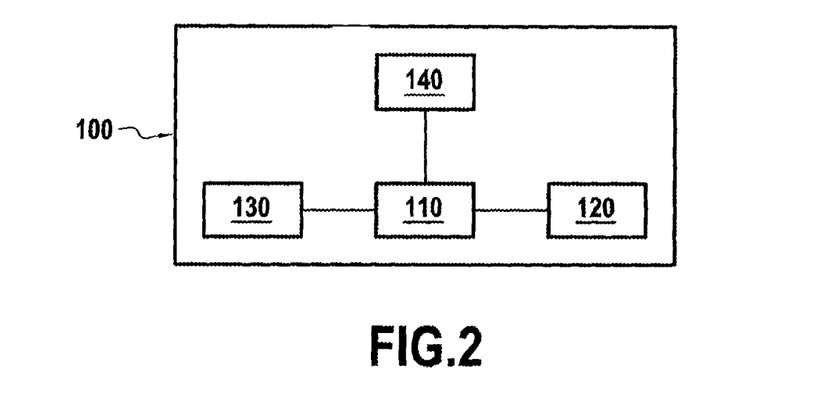
FIG. 2 shows a transmission regulation device in accordance with the invention in a particular embodiment.

The module 140 serves to transmit and to receive frames and signals over the network 1. The module 140 is suitable for receiving or transmitting simultaneously over different communications channels.

In the presently-described example, the module 140 is constituted by a card for giving access to the network 1 and in compliance with the IEEE 802.11 standards family. Under such circumstances, the various communications channels used by the module 140 may correspond to different frequency bands. For example, in an IEEE 802.11n network, the 2.4 gigahertz (GHz) band contains unused 2 megahertz (MHz) subbands between the non-superposed frame transmission channels. Likewise, in IEEE 802.11a and IEEE 802.11n networks, subbands in the frequency ranges [5.15 to 5.17] GHz and [5.33 to 5.35] GHz are unused, each having a bandwidth of 20 MHz.

In a variant, the module 140 is capable of transmitting in different frequency subbands within a given frequency band.

Each station 10, 10', and 10" performs a method of regulating frame transmission in the network 1 that makes use of the tournament method mentioned in the introduction. The regulation method may be performed by executing a computer program stored in the ROM 130.

In similar manner, each station 11 has a transmission regulation device 101 that performs a method of regulating frame transmission in the network 1. Nevertheless, in a station 11, the frame transmission regulation method relies on the congestion window procedure mentioned in the introduction.

In the tournament method, as described by CONTI in the above-referenced document, transmission authorizations or prohibitions are allocated to the stations by using binary random variables having a Bernoulli distribution law. That distribution law is defined by a probability of drawing an authorization to transmit. Such a probability is thus allocated to each station and on each selection round. The probabilities are preferably selected in such a manner that the collision rate is statistically as low as possible.

A procedure for selecting probabilities in optimum manner is described in the document "Analysis and optimization of MAC with constant size congestion windows for WLAN" by J. Galtier, Proceedings on the Third International Conference on Services and Networks Communications, INRIA, Library of Congress Number 2007930108, August 2007. In a particular embodiment described in patent document WO 2007/051946, the probabilities allocated to the various stations during a selection round may be a function of transmission authorizations or prohibitions drawn during preceding selection rounds in such a manner as to minimize the collision rate.

In another embodiment described in patent document WO 2009/095628, in particular in the section relating to performing an ordering method of the "round robin" type or a variant thereof (page 20 et seq. of that document), the value representative of a transmission authorization or prohibition allocated to a station for a given selection round is obtained by calculation: it is deduced from an index value, allocated to the station for the current tournament, and calculated on the basis of an index value allocated to the station for an earlier tournament.

Figure 3:
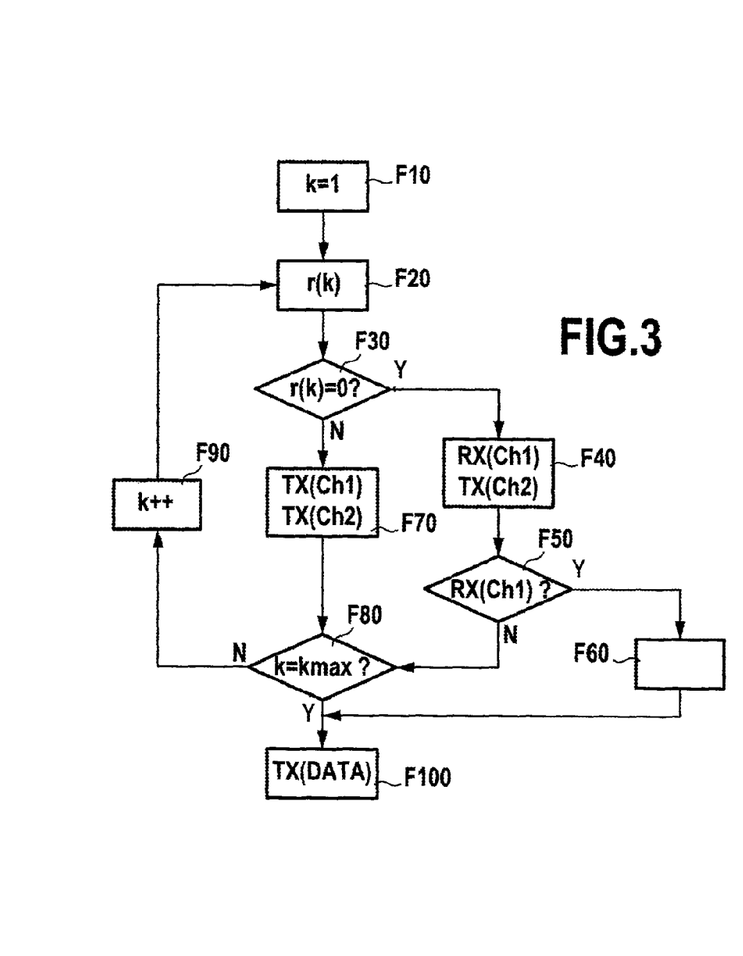
FIGS. 3 to 5 are flow charts showing the main steps of a transmission regulation method, respectively in first, second, and third implementations of the invention.

FIG. 3 is a flow chart showing the main steps of a transmission regulation method in a first implementation of the invention.

The method is implemented by the transmission regulation device 100 of a station 10, 10', 10" having at least one data frame for transmission over the network 1. All of the stations 10, 10', 10" having a data frame for transmission perform the same method simultaneously, without there being any need for mutual concertation or interrogation other than that described in the steps described below. The method described with reference to FIG. 3 corresponds to a so-called "tournament".

To describe this first implementation (FIG. 3), and also the other two implementations (FIGS. 4 and 5), a distinction is drawn between the various communications channels that are used during a tournament:

Ch1 is a first communications channel used by the stations 10, 10', and 10" for performing the tournament and for tie-breaking between the stations participating in the tournament;

Ch2 is a second communications subchannel, used by the stations 10, 10', and 10" for sending a channel busy signal: it serves to monitor whether a data frame transmission channel is busy in the way described in greater detail below with reference to FIG. 3; and Ch3 is a third communications subchannel, used by the stations 10, 10', and 10" in order to detect transmission by the stations 11 of a data frame over the channel Ch3 by listening to this channel Ch3; the use of this channel is described in greater detail below with reference to FIG. 4.

By way of example, the channels Ch1, Ch2, and Ch3 are subchannels of a frame transmission channel used by the stations 11, as specified in the 802.11 standard. Nevertheless, the channel Ch1 may be separate from the frame transmission channel of the stations 11.

In order to enable data frames to be exchanged between stations that do not participate in the tournament and stations that do participate in the tournament, the transmission channel of the stations 10, 10', 10", i.e. the channel used by a station 10, 10', 10" for transmitting data frames, must be identical to the transmission channel of the stations 11. In particular, if it is desired to guarantee compatibility with stations performing the WiFi 802.11 standard, the transmission channel needs to be selected to be identical to the channel specified in that standard.

In general, it nevertheless suffices for the transmission channel of the stations 11 to include at least the channel Ch2 in order to avoid collisions between stations that do not participate in the tournament with stations that do participate in the tournament, and the channel Ch3 in order for the stations 10, 10', and 10" to detect the transmission of data frames by the stations 11.

With radio channels, transmission on a frequency by a station 10 prevents transmission by a third party station 10' or 11 on the same frequency from being detected. When selecting frequencies making up a channel, account needs to be taken of the fact that in order for a station to be able to transmit on a channel A and to detect a transmission on a channel B, it is necessary for the channel B to have frequencies that are not covered by the channel A. Thus, the channels Ch2 and Ch3 may have frequencies in common. For example, the channel Ch2 may be a subchannel of the channel Ch3.

In the context of this document, a communications channel is made up of a set of at least one frequency. A communications channel is therefore not necessarily formed by a band or range of contiguous frequencies. Thus, the fact that two communications channels are separate means that the sets of frequencies that make up the channels are disjoint and that they therefore have no frequency in common.

In the description below of the first implementation, the following notation is used:

$k$ is the index identifying the current selection round of a tournament;

$k_{max}$ is the maximum number of selection rounds for a tournament;

$r$ is a binary variable; and $r(k)$ is the value of the binary value $r$ obtained for the selection round of index $k$; $r(k)$ belongs to the set $\{0, 1\}$, with the value "1" usually representing an authorization to transmit, while the value "0" represents a prohibition to transmit.

The sequence of $r(k)$ allocated to a station is referred to herein as a "key". The values $r(k)$ may be drawn on each selection round $k$. In a variant, the key constituted by the sequence of values $r(k)$ may be determined at the beginning of the tournament. Thus, below, when reference is made to obtaining a value $r(k)$, that might involve obtaining a value by making a draw or else by calculation using a known method, e.g. one of the above-mentioned known methods.

The method is described for a station 10, and all of the other stations 10', 10" perform the same method.

During a step F10, the station 10 initializes a variable k to the value 1, this variable representing the index for the current selection round.

This initialization step F10 is followed by a step F20 of obtaining a value r(k) for a binary variable r, associated with the station 10 for the current selection round of index k.

This step F20 of obtaining a variable value is followed by a step F30 during which it is verified whether the binary value r(k) that has been obtained is equal to "0".

If it is (transmission prohibition), this test F30 is followed by a step F40 during which the station 10 listens to the channel Ch1 in order to determine whether some other station 10', 10" has transmitted a signal indicating that that other station 10', 10" seeks to transmit a data frame. Simultaneously, the station 10 transmits a busy signal in the channel Ch2.

In step F50, if a signal has been detected in the channel Ch1 in step F40 (a positive result for the test of step F50), then the method terminates in a step F60 without the station 10 transmitting its data packet.

During this step F60, the station 10 waits for the end of the selection rounds, and it listens for the signals transmitted by the other stations in the channel Ch1. It waits for the end of the tournament and stores the representative information transmitted during the tournament.

In contrast, if in step F40 no signal is detected in the channel Ch1 (a negative result for the test of step F50), this test is followed by a test in a step F80 during which it is determined whether the round k is the last selection round, which amounts to verifying whether the value of k is equal to the value $k_{max}$.

If k is strictly less than $k_{max}$, then the result of the test in step F80 is negative. This step is then followed by a step F90 during which the value of the variable k is incremented by unity, in order to execute the following selection round.

If during the test of step F30, it is found that the binary value that is obtained is equal to the predetermined value 1 (transmission authorization), this step F30 is followed by a step F70 of transmitting a signal over the channel Ch1, which signal indicates that the station 10 has obtained an authorization to transmit and that it intends to transmit a data packet over the network. Simultaneously, the station 10 transmits a busy signal in the channel Ch2.

This step F70 of transmitting a signal is followed by the above-described step F80 during which it is verified whether the current selection round k is the last selection round.

If it is not, this test F80 is followed by the above-described incrementation step F90.

The incrementation step F90 is followed by executing above-described steps F20 to F80 once more, for the following selection round and using the same step ordering logic as described above.

In contrast, if the test of step F80 is positive (k=$k_{max}$) the tournament has finished and the station stores information representative of the fact that it has won the tournament.

After the tournament has been executed, in step F100, the station 10 uses the information stored in step F60 (the station lost the tournament) or F80 (the station won the tournament) to determine whether it has won or lost the tournament, and if it is has won the tournament, the station 10 transmits its data frame.

The tournament performed by the stations 10, 10', and 10" serves in effective manner to select a station that is authorized to transmit a data frame. Elsewhere, while the tournament is taking place, a station 11 may also seek to transmit a data frame. As explained in the introduction, in order to determine the instant at which a data frame is to be transmitted, a station 11 draws a number at random. That number is used for performing a countdown prior to transmitting the packet, with counting being deferred if the station finds that the channel is busy. For this purpose, the stations 11 make use, amongst others, of the channel Ch2 for frame transmission.

Thus, by virtue of a busy signal being transmitted over the channel Ch2 during the above-described steps F40 and F70, the stations 11 are informed that the network 1 is busy. In particular, if all of the stations 10, 10', 10" that are participating in the tournament obtain the value r(k)=0 during a turn k, then no signal is transmitted over the channel Ch1. Nevertheless, in the channel Ch2 to which the stations 11 are listening, a busy signal has been transmitted. The stations 11 thus defer their countdowns and they do not transmit frames while the tournament is taking place, thus making it possible to avoid collisions and thereby improve the effectiveness of the tournament.

In the method shown in FIG. 3, in each round, all of the stations 10, 10', 10" that are participating in the tournament transmit a busy signal in the channel Ch2, either in step F40 or else in step F70.

In a variant, only some of the stations 10, 10', 10" transmit the busy signal in the channel Ch2. By way of example, these may comprise a predetermined subset of stations, which subset may change on each round k. This makes it possible in particular to avoid too great a number of simultaneous transmissions of the busy signal, which would give rise to interference with other wireless telecommunications appliances. Under such circumstances, the transmission of a busy signal over the channel Ch2 (in step F40 or step F70) may be preceded by a test seeking to determine whether the station belongs to the subset that is to transmit the busy signal.

Also in a variant, if the channels Ch1 and Ch2 (and any other channels) are all in use by the station 11 for detecting whether the transmission channel is busy, the step F70 does not include transmitting a busy signal over the channel Ch2. Under such circumstances, the stations 11 can also detect that the network 1 is busy, either because at least one station has obtained the value r(k)=0 and transmits over the channel Ch2 in step F40, or else because at least one station has obtained the value r(k)=1 and transmits over the channel Ch1 in step F70, this transmission being detectable in the channel Ch2.

Figure 4:
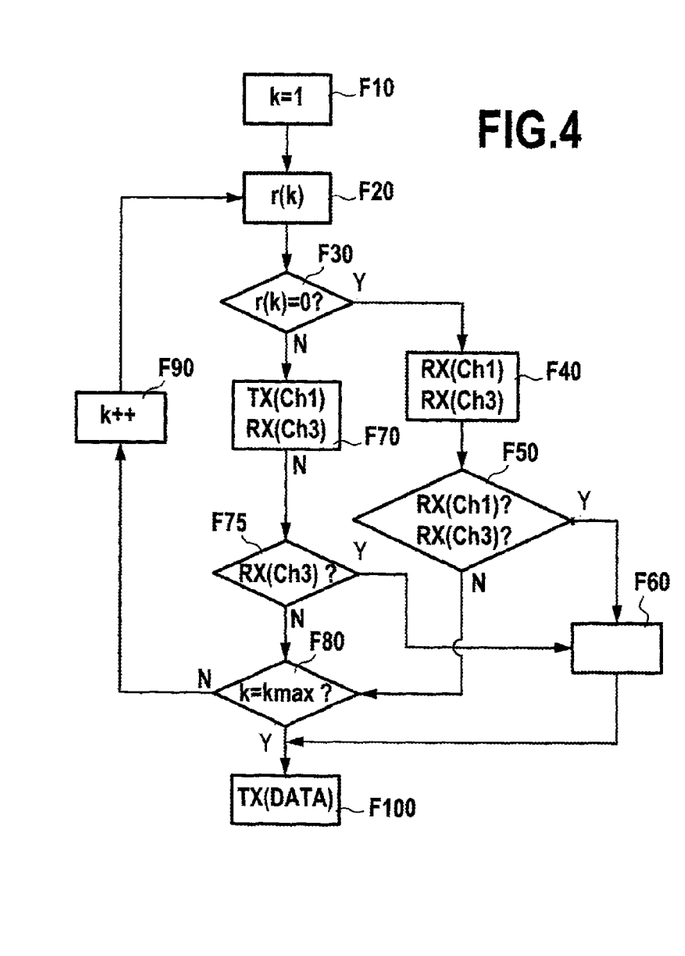

FIG. 4 is a flow chart showing the main steps of a transmission regulation method in a second implementation of the invention. The second implementation of the invention may be considered as being a variant of the first implementation. Thus, in the description below, the same notation and references are used and the description relates mainly to the aspects that are specific to the second implementation.

In the implementation of FIG. 4, in step F40, the station 10 listens to the channel Ch1 in order to determine whether some other station 10', 10" has transmitted a signal indicating that said other station 10', 10" seeks to transmit a data frame. Simultaneously, the station 10 listens to the channel Ch3 in order to determine whether a station 11 is transmitting a frame. The test of step F50 is positive if a signal is detected in the channel Ch1 or in the channel Ch3. Under such circumstances, the method terminates in step F60, without the station 10 transmitting its data packet.

In similar manner, in step F70, the station 10 transmits over the channel Ch1 a signal indicating that the station 10 has obtained an authorization to transmit and intends to transmit a data packet over the network. Simultaneously, the station 10 listens to the channel Ch3 in order to determine whether a station 11 is transmitting a frame.

Step F70 is followed by a test step F75 during which the station 10 determines whether it has detected transmission in the channel Ch3. If a signal has been detected in the channel Ch3, the result of the test in step F75 is positive and the method terminates in step F60, without the station 10 transmitting its data packet.

In contrast, if no signal is detected in the channel Ch3, the result of the test in step F75 is negative, and the method continues with step F80.

The second implementation thus makes it possible to use a channel Ch1 for performing the tournament, while simultaneously listening on another channel Ch3 over which stations 11 might be transmitting frames. If a frame transmitted by a station 11 is detected, then the tournament is interrupted without any station 10, 10', 10" transmitting a data frame and without the stations that have obtained a value representative of an authorization to transmit continuing to transmit signals over the channel Ch1. This makes it possible to avoid a collision between the frame transmitted by the station 11 and the frame that would have been transmitted by the station 10 that won the tournament.

Figure 5:
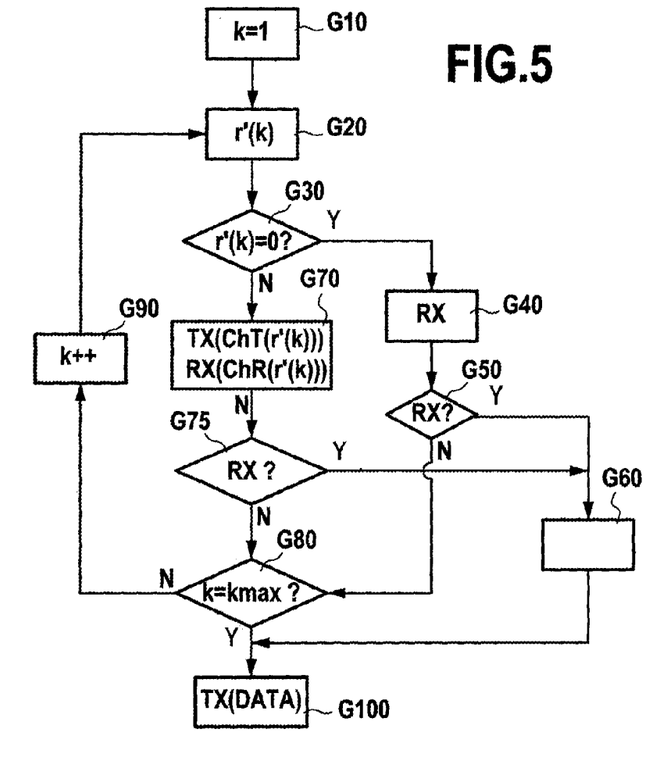

FIG. 5 is a flow chart showing the main steps of a transmission regulation method in a third implementation of the invention. In this third implementation, the channel Ch1 for performing the tournament is divided into subchannels in order to enable tie breaks to take place more quickly between the stations that are participating in the tournament.

In the description below of the third implementation, the following notation is used:

$\underline{m}$ represents the number of different communications channels Ch(i) used by the stations 10, 10', 10" for performing a tournament;

Ch(i) represents a communications channel No. $\underline{i}$, where $\underline{i}$ lies in the range 1 to $\underline{m}$, from among the $\underline{m}$ communications channels used by the stations 10, 10', 10" for performing the tournament; each of the channels Ch(i) is a subchannel of the channel Ch1 that is reserved for performing the tournament, with the subchannels Ch(i) being mutually disjoint;

ChT(i) represents a communications channel for transmitting signals during the tournament; this communications channel is defined from the subchannels Ch(i);

ChR(i) represents a communications channel for listening to signals during the tournament, this communications channel is defined from the channels ChT(i) or from the subchannels Ch(i);

$\underline{k}$ is the index identifying the current selection round of a tournament;

$k_{max}$ is the maximum number of selection rounds for a tournament;

r' is a variable that can take an integer value lying in the range 0 to $\underline{m}$; and r'(k) is the value of the variable r' obtained for the selection round of index $\underline{k}$; r'(k) belongs to the set {0, . . . m}, where the values 1 to $\underline{m}$ are representative of transmission authorizations, while the value "0" is representative of a prohibition to transmit. The values 1 to $\underline{m}$ are representative respectively of decreasing priority levels used for tie breaking between stations during the tournament, where $\underline{m}$ is the lowest priority level that can be allocated to a station during a selection round. A priority level $\underline{i}$ is thus allocated to each of the channels Ch(T)i, for i=1 to $\underline{m}$.

With radio channels, these channels ChT(i) must be arranged in such a manner that for 1<=i<=m the channel ChT(i) of priority level higher than the channel ChT(j), where 1<=i≤j≤=m, has at least one frequency (or channel portion) that is not present in the channel ChT(j), so that a station transmitting on the channel ChT(j) can detect a transmission by a station transmitting on the channel ChT(i). In practice, detection is possible on this frequency (channel portion) since it is not covered by the channel ChT(i). In summary, when i<j, a transmitter of a signal over ChT(j) must be capable of detecting another station transmitting a signal on the channel ChT(i).

The way the channels ChR(i) are made up then follows from the choice of channels ChT(i): a channel ChR(i) is made up of at least one frequency (or channel portion) or of each frequency (channel portion):

that forms part of a channel ChT(j1) allocated a priority level j1 that is higher than the priority level represented by the value $\underline{i}$ (i.e. j1<i); but that does not form part of any channel ChT(j2) given a priority level j2 that is equal to or less than the priority level represented by the value $\underline{i}$ (i.e. j2>=i).

If the value of $\underline{i}$ is greater than or equal to 3, a channel ChR(i) must be made up in such a way as to enable a plurality of channels ChT(j1) of higher priority level (j1=1, j2=2, etc.) to be detected. In practice, at least one frequency (channel portion) of each channel ChT(j1) of higher priority level that does not form part of any channel ChT(j2) of lesser or equal priority level will form part of the channel ChR(i).

In a first implementation, for 1<=i<=m, the channel ChT(i) is identical to the subchannel Ch(i), and the channel ChR(i) is the union of those channels Ch(j) for which j<i.

Figure 6:
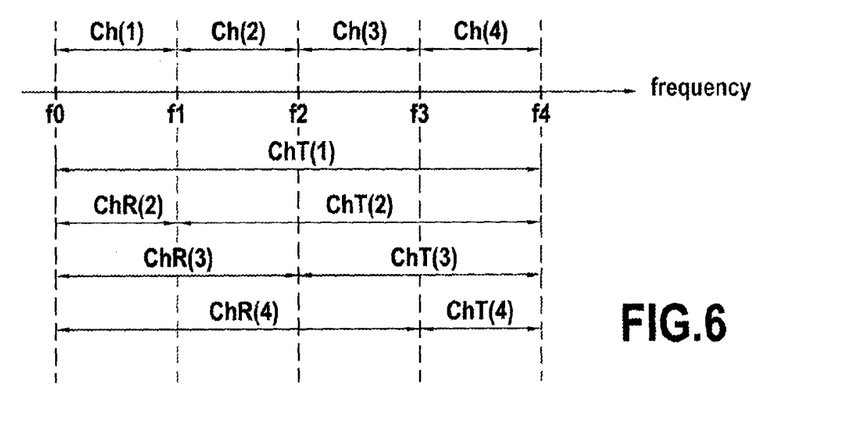
FIG. 6 shows channels that can be used in the implementation of FIG. 5.

In a second implementation, for 1<=i<=m, the channel ChT(i) is the union of the channels Ch(j) for which i<=j<=m, and the channel ChR(i) is equal to the union of the channels Ch(j) such that j<i. FIG. 6 shows this second implementation when each of the subchannels Ch(i) is constituted by a continuous frequency subband.

The sequence of r'(k) allocated to a station is referred herein as a key. The values r'(k) may be drawn during each selection round $\underline{k}$. In a variant, the key constituted by the sequence of values r'(k) may be determined at the beginning of the tournament. Thus, below where reference is made to obtaining a value r'(k), that might involve obtaining a value by making a draw or else by performing a calculation, e.g. using one of the above-mentioned known methods.

The method is described for one station 10, with all of the others stations 10', 10" performing the same method.

During a step G10, the station 10 initializes a variable $\underline{k}$ to the value 1, this variable representing the index of the current selection round.

This initialization step G10 is followed by a step G20 of obtaining a value r'(k) for a priority level r' that is associated with the station 10 for the current selection round of index $\underline{k}$.

This step G20 of obtaining a priority level value is followed by a step G30 during which it is verified whether the value r'(k) that has been obtained is equal to the value "0", representing transmission prohibition.

Under such circumstances (i.e. transmission prohibition), the test G30 is followed by a step G40 during which the station 10 listens to the $\underline{m}$ communications channels Ch(i) for i=1 to $\underline{m}$ in order to determine whether some other station 10', 10" has transmitted a signal indicating that said other station 10, 10" seeks to transmit a data frame.

In step G50, if a signal has been detected in one of the channels Ch(i) in step G40 (positive result for the test of step G50), the method terminates by a step G60 without the station 10 transmitting its data packet.

During this step G60, the station 10 waits for the end of the selection rounds and listens to the signals transmitted by the other stations over the channels Ch(i). It waits for the end of the tournament and it stores the representative information transmitted during the tournament.

In contrast, if in step G40 no signal has been detected in the channels Ch(i) (a negative result for the test of step G50), that test is followed by a test in a step G80 during which it is determined whether the round $\underline{k}$ is the last selection round, which amounts to verifying whether the value of $\underline{k}$ is equal to the value $k_{max}$.

If $\underline{k}$ is strictly less than $k_{max}$, the result of the test in step G80 is negative. This step is then followed by a step G90 during which the value of the variable $\underline{k}$ is incremented by unity, in order to execute the following selection round.

If during the test of step G30 it is found that the value r'(k) that has been obtained is not equal to "0" (transmission authorization), the test G30 is followed by a step G70 of transmitting a signal over a communications channel ChT (r'(k)) to indicate that the station 10 has obtained an authorization to transmit and intends to transmit a data packet over the network. In other words, in the third implementation, the communications channel over which the signal indicating that the station 10 has obtained an authorization to transmit is determined as a function of the value obtained for r'(k) that is representative of an authorization to transmit.

Simultaneously, still in step G70, unless the value obtained r'(k) is equal to 1, the station 10 listens to the communications channels ChR(r'(k)) having at least one frequency (or channel portion) forming part of a communications channel ChT(j1) associated with a priority level higher than the priority level r'(k) (i.e. j1<r'(k)), but not forming part of any communications channel ChT(j2) associated with a priority level less than or equal to the priority level r'(k) (i.e. j2>=r'(k)).

This step G70 of transmitting a signal over a channel and of listening to at least one other channel is followed by a step G75. In step G75, if a signal has been detected in one of the channels ChR(r'(k)) in step G70 (a positive result for the test of step G75), then the method terminates by above-described step G60 without the station 10 transmitting its data packet.

In contrast, if in step G70 no signal is detected in the channel ChR(r'(k)) (a negative result for the test of step G750), this test is followed by a test in above-described step G80 during which it is verified whether the current selection round k is the last selection round.

If it is not, then the test G80 is followed by the above-described incrementation step G90.

The incrementation step G90 is followed by executing above-described steps G20 to G80 once more for the following selection round and applying the same step-ordering logic as that described above.

In contrast, if the test of step G80 is positive ($k=k_{max}$), the tournament has finished and the station stores information representative of the fact that it won the tournament.

After the tournament has been executed, in a step G100, the station 10 uses the information stored in step G60 (the station lost the tournament) or G80 (the station won the tournament) to determine whether it won or lost the tournament, and if it won the tournament, the station 10 sends a data frame.

The tournament performed by the stations 10, 10', and 10" is an effective way of selecting a station that is authorized to transmit a data frame, while using a small number $k_{max}$ of selection rounds. On each round, it is possible to distinguish between m+1 classes of station instead of only two as in prior art tournaments. Stations for which the value r'(k) is not equal to 0 and the lowest value can continue the tournament, the other stations being eliminated. Under such circumstances, the probability of there being a negative outcome to the tournament, i.e. transmission with collision when at least two stations consider that they have won the tournament, reduces asymptotically with $1/(m+1)^{k_{max}}$. The number of rounds $k_{max}$, and thus the duration of the tournament, can thus be reduced, while conserving a determined probability for a negative outcome.

If $\underline{m}$ is high enough, it is even possible to envisage having a tournament with a single round ($k_{max}=1$). Under such circumstances, the steps G10, G80, and G90 are not necessary.

By way of example, for m=43, the method of FIG. 4 makes it possible to distinguish between 44 classes of station in a single round, whereas in the prior art that would require six rounds.

An example is described in which, in step G70, a station 10 transmits over a communications channel that is determined as a function of the value r'(k) that it has obtained, and listens to the communications channels having lower indices. In a variant, it is possible to envisage any other scheme for transmitting and listening as a function of the value obtained for r'(k) and enabling the stations to be distinguished. For example, a station 10 may transmit over the communications channel of index r'(k), and the channels of higher indices, while simultaneously listening to the communications channels of lower indices.

The various implementations described above may be combined.

For example, in an implementation corresponding to a combination of the first implementation (FIG. 3) and the third implementation (FIG. 5), the stations 10, 10', 10" use a set of channels constituted by subchannels Ch(i) of the channels Ch1, for i=1 to $\underline{m}$, in order to perform a tournament, and they transmit a busy signal for the stations 11 in another channel Ch2.

In similar manner, in an implementation corresponding to a combination of the second implementation (FIG. 4) and third implementation (FIG. 5), the stations 10, 10', 10" use a set of channels constituted by subchannels Ch(i) of the channel Ch1 for i=1 to $\underline{m}$ in order to perform the tournament, and they listen for possible transmission of a frame by a station 11 on another channel Ch3.

In an implementation corresponding to a combination of the first implementation (FIG. 3), of the second implementation (FIG. 4), and of the third implementation (FIG. 5), the stations 10, 10', 10" use a channel Ch1 for performing the tournament, transmitting a busy signal for stations 11 over another channel Ch2, and listening for possible transmission of a frame by a station 11 on another channel Ch3. Such an implementation presents an advantage in that a station 11 that begins to transmit a frame can transmit its frame by using part of the channel Ch3 before detecting the busy signal sent over the channel Ch2. Under such circumstances, the stations 10, 10', 10" detect the presence of a transmission in the channel Ch3, thereby having the effect of interrupting the performance of the tournament. Since none of the stations 10, 10', 10" has won the tournament, none of them transmits a frame, where that would have given rise to a collision with the frame being transmitted by the station 11. This is particularly advantageous when the tournament takes place after a PIFS interval (as defined in the IEEE 802.11 family of standards) since at that same instant the access points can transmit management frames.

The invention is applicable to WLAN networks and more generally to CSMA/CA networks in which stations can communicate by using various communications channels, e.g. corresponding to different frequency bands. It is particularly advantageous for use in a network in which stations of the invention cohabit with stations using a prior art transmission regulation method, e.g. based on a congestion window mechanism.

The invention is also applicable to systems for transmitting signals that are optical, or more generally electromagnetic, in which a plurality of communications channels are available, e.g. defined by their transmission frequencies.

The invention is also applied to wired networks in which signal transmission can take place over different communications channels, e.g. defined by their transmission frequencies.

The invention claimed is:

1. A transmission regulation method suitable for being performed by a station having at least one data frame for transmitting over a telecommunications network, the method being performed by at least one station participating in a tournament and comprising, during at least one selection round from a set of selection rounds in said tournament:
   obtaining a value representative either of an authorization to transmit or else of a prohibition to transmit the frame;
   when the value is representative of an authorization to transmit, transmitting an information signal over a first communications channel of the network, said network comprising stations participating in said tournament and stations which are not participating in said tournament and said first communications channel being utilized by stations participating in said tournament, wherein said information signal informs other stations participating in said tournament that the station has obtained a value representative of an authorization to transmit;
   when the value is representative of a prohibition to transmit, listening for an information signal, if any, transmitted over the first communications channel of the network; and
   simultaneously with said transmitting over said first communications channel of the network or listening to said first communications channel of the network:
   listening to a second communications channel of the network utilized by stations which are not participating in said tournament, and if a signal transmitted by another station which is not participating in said tournament is detected on the second communications channel, determining that the station participating in said tournament is not authorized to transmit a data frame; or
   transmitting a busy signal over the second communications channel of the network to avoid the transmission of a data frame over the telecommunications network by another station that is not participating in the tournament,
   wherein said second communications channel is different from the first communications channel.

2. A transmission regulation method according to claim 1, wherein the first communications channel and the second communications channel correspond to two different sets each of at least one frequency.

3. A transmission regulation method according to claim 2, wherein the listening to or transmitting over the second communications channel comprises, simultaneously with transmitting or listening for the information signal in the first communications channel, transmitting a busy signal in the second channel.

4. A transmission regulation method according to claim 3, wherein the transmission of the busy signal in the second channel is preceded by a test seeking to determine whether the station belongs to a subset of stations that are to transmit the busy signal.

5. A transmission regulation method according to claim 2, wherein the listening to or transmitting over the second communications channel, comprises, simultaneously with transmitting or listening for the information signal in the first communications channel, listening to the second channel for any data frame transmitted by a station that is not participating in the tournament, and when a frame is detected in the second channel, determining that the station that is participating in the tournament is not authorized to transmit a data frame.

6. A transmission regulation method according to claim 2, wherein a plurality of values are representative of an authorization to transmit,
   the first communications channel is selected from a set of communications channels as a function of the value that has been obtained that is representative of an authorization to transmit,
   the second communications channel is made up of at least one frequency that does not form part of the selected channel; and
   the listening to or transmitting over the second communications channel comprises, simultaneously with the transmission of the information signal over the first communications channel, listening for an information signal in the second communications channel.

7. A transmission regulation method according to claim 6, wherein a priority level is allocated to each of the channels of the set of channels and each of the values representative of an authorization to transmit is representative of the priority level,
   the first communications channel is the channel having allocated thereto the priority level represented by the value that has been obtained, and
   the second communications channel is made up of at least one frequency forming part of a channel of the set having allocated thereto a priority level that is higher than the priority level represented by the value that has been obtained, but that does not form part of a channel of the set having allocated thereto a priority level that is less than or equal to the priority level represented by the value that has been obtained.

8. A transmission regulation device for a station participating in a tournament, said station having at least one data frame to be transmitted over a telecommunications network, the device comprising:
   a hardware processor which acts during at least one selection round of a set of selection rounds, to obtain a value that is representative either of an authorization to transmit or else of a prohibition to transmit the frame;
   a transmitter which transmits an information signal in a first communications channel of the network, said network comprising stations participating in said tournament and stations which are not participating in said tournament and said first communications channel being utilized by stations participating in said tournament, wherein said information signal informs other stations participating in said tournament that the station has obtained a value representative of an authorization to transmit, wherein said transmitter is activated when the value is representative of an authorization to transmit;

a listener which listens for any information signal transmitted over the first communications channel of the network, wherein said listener which listens for any information signal transmitted over the first communications channel is activated when the value is representative of a prohibition to transmit; and a listener or transmitter which listens to or transmits over a second communications channel of the network that is different from the first communications channel and that is utilized by stations which are not participating in said tournament, wherein said listener or transmitter which listens to or transmits over the second communications channel determines that the station participating in the tournament is not authorized to transmit a data frame if a signal transmitted by another station which is not participating in said tournament is detected when listening to the second communications channel, or transmits a busy signal over the second communications channel of the network to avoid the transmission of a data frame over the telecommunications network by another station that is not participating in the tournament, and wherein said listener or transmitter which listens to or transmits over the second communications channel listens to or transmits over said second communications channel simultaneously with transmission over said first communications channel of the network or with listening to said first communications channel of the network by said listener or transmitter which listens to or transmits over said first communication channel.

9. A transmission regulation device according to claim 8, wherein when the listener or transmitter which listens to or transmits over the second communications channel transmits a busy signal over the second channel, said device simultaneously transmits the information signal in the first communications channel or listens for the information signal in the first communications channel.

10. A transmission regulation device according to claim 8, wherein the listener or transmitter which listens to or transmits over the second communications channel listens to the second channel for any data frame transmitted by a station that is not participating in the tournament, while simultaneously transmitting or listening to the information signal in the first communications channel, and wherein, when a frame is detected in the second channel, the regulation device determines that the station that is participating in the tournament is not authorized to transmit a data frame.

11. A transmission regulation device according to claim 8, wherein a plurality of values are representative of an authorization to transmit, the first communications channel is selected from a set of communications channels as a function of the value that has been obtained that is representative of an authorization to transmit, the second communications channel is made up of at least one frequency that does not form part of the selected channel; and the listener or transmitter which listens to or transmits over the second communications channel listens for an information signal in the second communications channel while simultaneously transmitting the information signal in the first communications channel.

12. A computer having stored thereon a program including software instructions for performing a transmission regulation method when the program is executed by a data processor, wherein the transmission method is suitable for being performed by a station having at least one data frame for transmitting over a telecommunications network, wherein the method is performed by at least one station participating in a tournament and wherein the method comprises, during at least one selection round from a set of selection rounds in said tournament:

obtaining a value representative either of an authorization to transmit or else of a prohibition to transmit the frame;

when the value is representative of an authorization to transmit, transmitting an information signal over a first communications channel of the network, said network comprising stations participating in said tournament and stations which are not participating in said tournament and said first communications channel being utilized by stations participating in said tournament, wherein said information signal informs other stations participating in said tournament that the station has obtained a value representative of an authorization to transmit;

when the value is representative of a prohibition to transmit, listening for an information signal, if any, transmitted over the first communications channel of the network; and simultaneously with said transmitting over said first communications channel of the network or listening to said first communications channel of the network:

listening to a second communications channel of the network utilized by stations which are not participating in said tournament, and if a signal transmitted by another station which is not participating in said tournament is detected on the second communications channel, determining that the station participating in said tournament is not authorized to transmit a data frame; or transmitting a busy signal over the second communications channel of the network to avoid the transmission of a data frame over the telecommunications network by another station that is not participating in the tournament, wherein said second communications channel is different from the first communications channel.

13. A non-transitory data processor readable recording medium having recorded thereon a program including program code instructions for executing a transmission regulation method, wherein the transmission method is suitable for being performed by a station having at least one data frame for transmitting over a telecommunications network, wherein the method is performed by at least one station participating in a tournament and wherein the method comprises, during at least one selection round from a set of selection rounds in said tournament:

obtaining a value representative either of an authorization to transmit or else of a prohibition to transmit the frame;

when the value is representative of an authorization to transmit, transmitting an information signal over a first communications channel of the network, said network comprising stations participating in said tournament and stations which are not participating in said tournament and said first communications channel being utilized by stations participating in said tournament, wherein said information signal informs other stations participating in said tournament that the station has obtained a value representative of an authorization to transmit;

when the value is representative of a prohibition to transmit, listening for an information signal, if any, transmitted over the first communications channel of the network; and simultaneously with said transmitting over said first communications channel of the network or listening to said first communications channel of the network:

listening to a second communications channel of the network utilized by stations which are not participating in said tournament, and if a signal transmitted by another station which is not participating in said tournament is detected on the second communications channel, determining that the station participating in said tournament is not authorized to transmit a data frame; or transmitting a busy signal over the second communications channel of the network to avoid the transmission of a data frame over the telecommunications network by another station that is not participating in the tournament, wherein said second communications channel is different from the first communications channel.

14. A transmission regulation method suitable for being performed by a station having at least one data frame for transmitting over a telecommunications network, the method comprising, during at least one selection round from a set of selection rounds:

obtaining a value representative either of an authorization to transmit or else of a prohibition to transmit the frame, wherein a plurality of values are representative of an authorization to transmit;

when the value is representative of an authorization to transmit, transmitting an information signal over a first communications channel of the network, in order to inform the other stations that the station has obtained a value representative of an authorization to transmit; or when the value is representative of a prohibition to transmit, listening for an information signal, if any, transmitted over the first communications channel of the network; and listening to or transmitting over a second communications channel of the network that is different from the first communications channel, wherein the first communications channel and the second communications channel correspond to two different sets each of at least one frequency, wherein the first communications channel is selected from a set of communications channels as a function of the value that has been obtained that is representative of an authorization to transmit, wherein a priority level is allocated to each of the channels of the set of channels and each of the values representative of an authorization to transmit is representative of the priority level, wherein the first communications channel is the channel having allocated thereto the priority level represented by the value that has been obtained, wherein the second communications channel is made up of at least one frequency that does not form part of the selected channel, wherein the second communications channel is made up of at least one frequency forming part of a channel of the set having allocated thereto a priority level that is higher than the priority level represented by the value that has been obtained, but that does not form part of a channel of the set having allocated thereto a priority level that is less than or equal to the priority level represented by the value that has been obtained, and wherein the listening to or transmitting over the second communications channel comprises, simultaneously with the transmission of the information signal over the first communications channel, listening for an information signal in the second communications channel.

* * * * *